UNITED STATES PATENT OFFICE.

JOHN F. JOHNSTON, OF BARBERTON, OHIO, ASSIGNOR TO THE ELECTRIC RUBBER RECLAIMING COMPANY, OF AKRON, OHIO, A CORPORATION OF OHIO.

COTTON-CONTAINING RUBBER COMPOSITION.

1,291,536.

Specification of Letters Patent.   Patented Jan. 14, 1919.

No Drawing.   Application filed April 25, 1918.   Serial No. 230,786.

*To all whom it may concern:*

Be it known that I, JOHN F. JOHNSTON, a citizen of the United States, residing at Barberton, in the county of Summit and State of Ohio, have invented certain new and useful Improvements in Cotton-Containing Rubber Composition, of which the following is a specification.

This invention relates to a new composition comprising reclaimed rubber and reclaimed cotton fiber distributed therethrough.

Heretofore in processes of reclaiming rubber it has been sought to eliminate the cotton present in the waste rubber. I have discovered that it is possible to produce the necessary changes in the rubber to permit its being used for the purposes for which reclaimed rubber is employed, without destroying the cotton fiber which is almost universally present in a substantial amount in rubber waste. I have discovered that, by subjecting rubber waste containing cotton in the form of cloth, cords, thread and the like to the action of a dilute solution of caustic soda, kerosene and resin, preferably in the proportions of 15 gallons of a 2 per cent. by weight solution of sodium hydroxid, 15 pounds of kerosene and 5 pounds of resin to each 100 pounds of rubber being treated, at a temperature of about 300° F. for six or seven hours, I am able to obtain a reclaimed stock or product wherein substantially all of the cotton present in the waste rubber is present. I have found by experiment that the cotton fiber present in the reclaimed rubber stock, while differing from ordinary uncausticized cotton fiber, has nevertheless substantial strength and is able to serve as a material and valuable addition to the reclaimed rubber. I have also found that the treatment of the cotton fiber by the solution described permits its being completely unstranded and tends to produce a light, porous, fluffy causticized cotton fiber having greater absorptive power for the rubber present than ordinary cotton fiber and being more uniformly distributed through the rubber mass than it is possible to obtain where ordinary cotton is added to rubber or rubber compounds.

It appears from experiments made that the action of the reclaiming solution and particularly the caustic alkali therein has a distinct causticizing action on the cotton fiber in that some part of the cotton is partially dissolved or changed whereby the porosity of the fiber is increased and that this change takes place without material deterioration in the strength of the cotton fiber. Furthermore, from my experiments it appears that I may obtain in the manner described, a reclaimed product containing a higher percentage of cotton fiber than can be obtained by incorporating ordinary cotton fiber with reclaimed or other rubber without so disintegrating the fiber as to seriously impair its strength. For example, I have produced reclaimed rubber containing reclaimed cotton fiber in which the fiber comprises in excess of 50 per cent. by weight of the entire mass, such product being thoroughly homogeneous, of great toughness and durability, and possessing the property of being capable of being dyed by the absorption of soluble dyes, such as anilin dyes.

The product reclaimed as described is superior for many purposes to ordinary reclaimed rubber in which the cotton has been eliminated, such for example, as for use in the manufacture of artificial leather, shoe soles, heels, upholstering material and for other uses where the elasticity of the product is not material nor desired.

In an application filed on or about the 25th day of April, 1918, I have described and claimed a process of treating rubber waste in which the product above described is produced and such process is not claimed herein.

Having thus described my invention, I claim:

1. The herein described product comprising a rubber composition having uniformly distributed therethrough light, porous rubber waste containing cotton fiber such fiber being the residue left from the treatment of cotton fiber with caustic alkali.

2. The herein described product comprising reclaimed rubber and reclaimed cotton fiber, such cotton fiber comprising cotton which has been subjected to the action of a caustic alkali, the cotton fiber being substantially uniformly distributed throughout the rubber.

3. The herein described product prepared from rubber waste containing cotton and comprising reclaimed rubber having substantially uniformly distributed therethrough cotton fiber which has been subjected to the action of a caustic alkali reclaimed from the cotton in the waste rubber.

4. The herein described product comprising a substantially homogeneous mixture of reclaimed rubber and causticized cotton fiber which has been subjected to the action of a caustic alkali.

In testimony whereof I affix my signature in presence of two witnesses.

JOHN F. JOHNSTON.

Witnesses:
   JOHN C. FRANK,
   JAMES L. CRAWFORD.